Oct. 11, 1927.

J. H. WIGGINS 1,645,313

STORAGE TANK FOR GASES AND VOLATILE LIQUIDS

Filed Aug. 30, 1926    3 Sheets-Sheet 1

INVENTOR
J. H. Wiggins.
By Bakewell & Church
ATTORNEYS

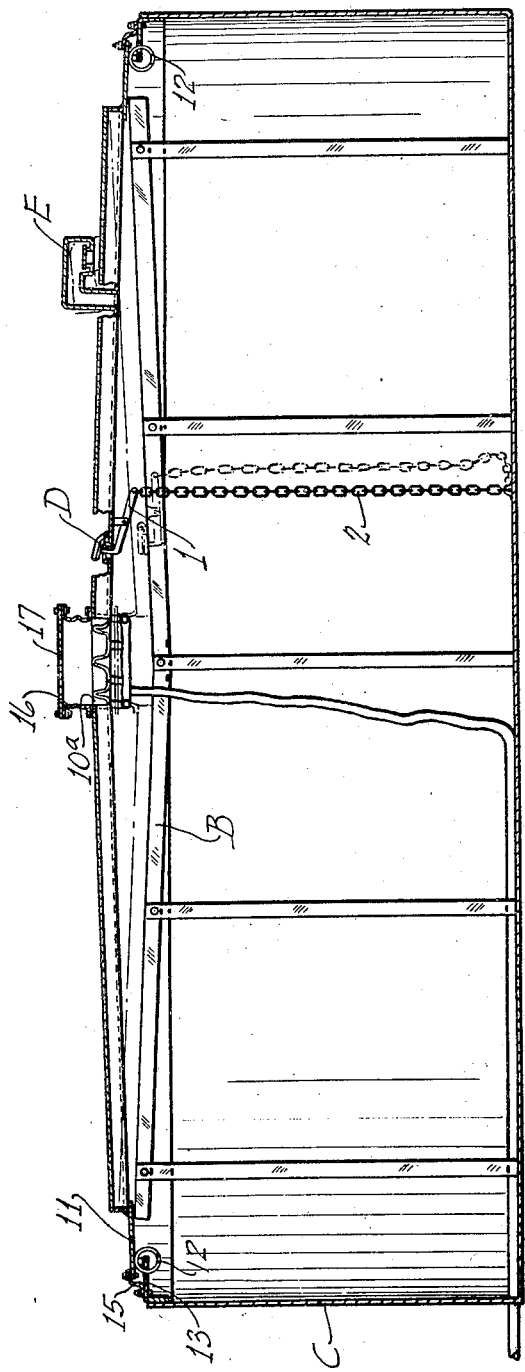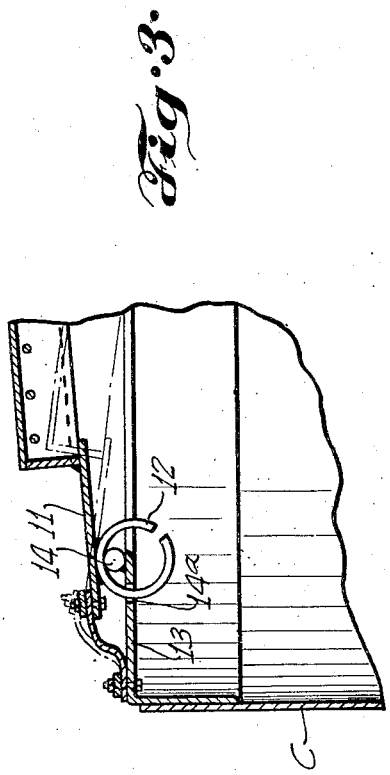

Oct. 11, 1927.  1,645,313
J. H. WIGGINS
STORAGE TANK FOR GASES AND VOLATILE LIQUIDS
Filed Aug. 30, 1926  3 Sheets-Sheet 3

INVENTOR
J. H. Wiggins
By Bakewell & Church
ATTORNEYS

Patented Oct. 11, 1927.

1,645,313

UNITED STATES PATENT OFFICE.

JOHN H. WIGGINS, OF BARTLESVILLE, OKLAHOMA.

STORAGE TANK FOR GASES AND VOLATILE LIQUIDS.

Application filed August 30, 1926. Serial No. 132,540.

This invention relates to large metal tanks of the kind that are used for storing gases and volatile liquids.

One object of my invention is to provide a storage tank that is equipped with a metal roof or top, connected to the side wall of the tank, and constructed so that it is capable of flexing and moving upwardly and downwardly relatively to the side wall of the tank in normal operation, so as to increase and decrease the vapor space or gas space of the tank, without liability of setting up injurious strains in the neutral fibre of the metal from which said roof is constructed.

Another object is to provide an apparatus for storing gases and volatile liquids that comprises a tank, a top or roof connected to the side wall of said tank and constructed so that it is capable of flexing or moving upwardly relatively to said side wall so as to increase the vapor space or gas space of the tank, and means for automatically venting said space when a predetermined maximum volume is reached inside of the tank, thereby preventing the roof from being subjected to a bursting strain.

And still another object is to provide a storage tank that is equipped with a flexible, metal roof, connected to the side wall of the tank and constructed so that it is capable of flexing upwardly and downwardly from a horizontal plane, and a supporting means in the tank for sustaining said roof when the internal pressure of the tank or when the pressure on the underside of the roof is less than the weight of the roof, said supporting means being designed so that an abnormal external load on the roof, or an abnormal vacuum exerted on the underside of the roof, will not result in the roof being subjected to a severe tensil strain. Other objects and desirable features of my invention will be hereinafter pointed out.

Figure 1 of the drawings is a vertical transverse sectional view of a liquid storage tank constructed in accordance with my invention.

Figure 2 is a vertical transverse sectional view, illustrating another form of my invention.

Figure 3 is an enlarged vertical sectional view, illustrating the means that is used to pivotally connect the peripheral edge of the roof to the side wall of the tank and produce a gas-tight joint between said parts.

Figure 5:
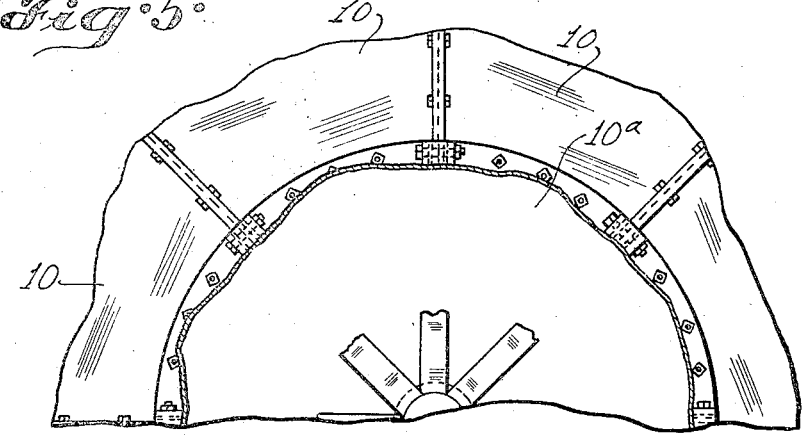
Figure 6:
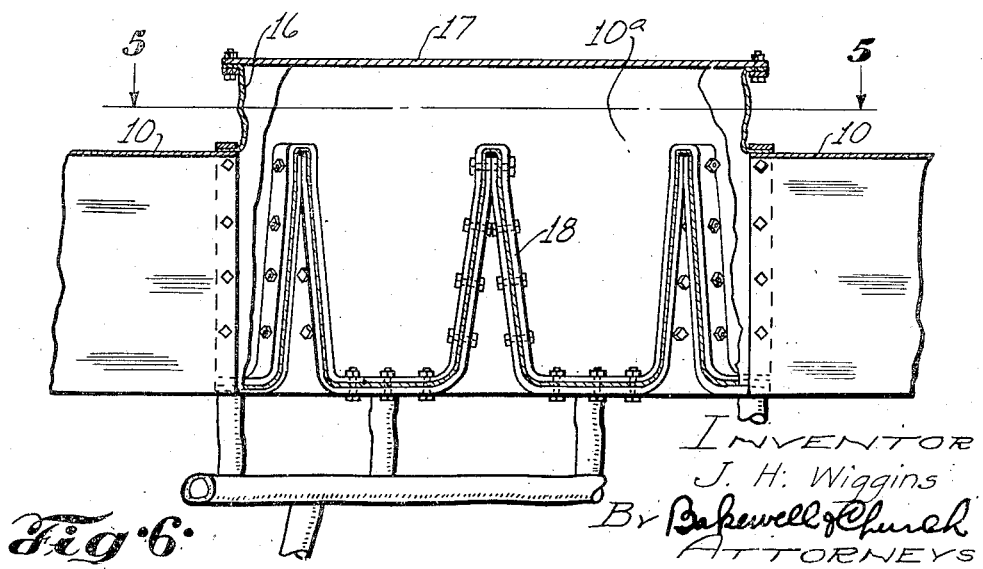

Figure 5 is an enlarged horizontal sectional view, illustrating the means that is used to close the center opening of the roof, said view being taken on the line 5—5 of Figure 6; and Figure 6 is an enlarged vertical sectional view of the center portion of the roof, illustrating how the wedge-shaped members that constitute the roof are combined with the flexible element that forms part of the closure for the center hole in the roof.

When my invention is embodied in a large metal tank of the kind that is used in oil fields for storing oil, i. e., a tank of about 115 ft. in diameter, the roof or top of the tank will be connected at its peripheral edge to the side wall of the tank and will be constructed from sheets of metal, usually about $\frac{3}{16}$ of an inch in thickness, connected together in such a way as to form practically a one-piece, imperforate diaphragm whose central portion is capable of flexing upwardly and downardly a limited distance from a horizontal plane in normal operation, without producing injurious strains in the roof, the metal plates from which the roof is constructed being capable of wrinkling sufficiently to provide for the variation in radii and circumference without setting up injurious strains in the neutral fibre of the metal. The roof normally occupies a position with its central portion depressed and sustained by a supporting structure inside of the tank that conforms approximately to the shape of same, but whenever the internal pressure in the tank exceeds the weight of the roof, the central portion of the roof will move or flex upwardly into such a position that the roof is changed from an inverted cone to a cone that projects above a horizontal plane located intermediate the two extreme positions of the central portion of the roof, thereby automatically increasing the vapor space above the surface of the liquid. Under normal conditions, i. e., a full or nearly full tank, the rise and fall of the central portion of the roof, as above described, will permit the gases in the tank to expand and contract without escaping from the tank and without subjecting the roof to destructive strains due to the fact that when the roof reaches its horizontal position, during its upward movement, the roof will wrinkle, and thus set up tension on one side of the neutral fibre of the metal and pressure on the other side of the neutral fibre, without stressing the neutral fibre. In order to take care of abnormal conditions, such as filling, the tank is equipped with a relief valve or venting mechanism that is combined with the roof in such a manner that the movement of the roof relatively to the side wall of the tank is utilized to open said valve when the internal volume of the tank approaches a dangerous degree. In other words, in order to prevent the roof from being subjected to a bursting strain, due to more gas entering or accumulating in the vapor or gas space when the roof is flexed upwardly to its full capacity, a venting mechanism is provided which operates automatically at a certain volume, and thus prevents the internal volume of the tank from reaching a dangerous degree. This makes possible a low pressure valve absolutely tight and absolutely certain of opening at the right time. When liquid is being withdrawn from the tank, air is admitted to the interior of the tank by a vacuum relief valve which may be of any preferred type or kind. In small tanks, or in large tanks, where it is necessary or desirable to have a vapor space that is capable of great variation, the roof or top of the tank is formed from a number of substantially wedge-shaped members that radiate from the center of the roof and which are of substantially V-shape or channel shape in cross section so that the angularly-disposed portions or side flanges of same will be capable of flexing or bending to provide for the change in radii and circumference of the central portion of the roof when it moves either upwardly or downwardly a considerable distance from a horizontal plane. In such a structure the peripheral portion of the roof is hinged or pivotally connected to the side wall of the tank and means is provided for maintaining a gas-tight joint between the roof and side wall and still provide for a slight relative movement between the side wall and the peripheral edge of the roof.

Figure 1:
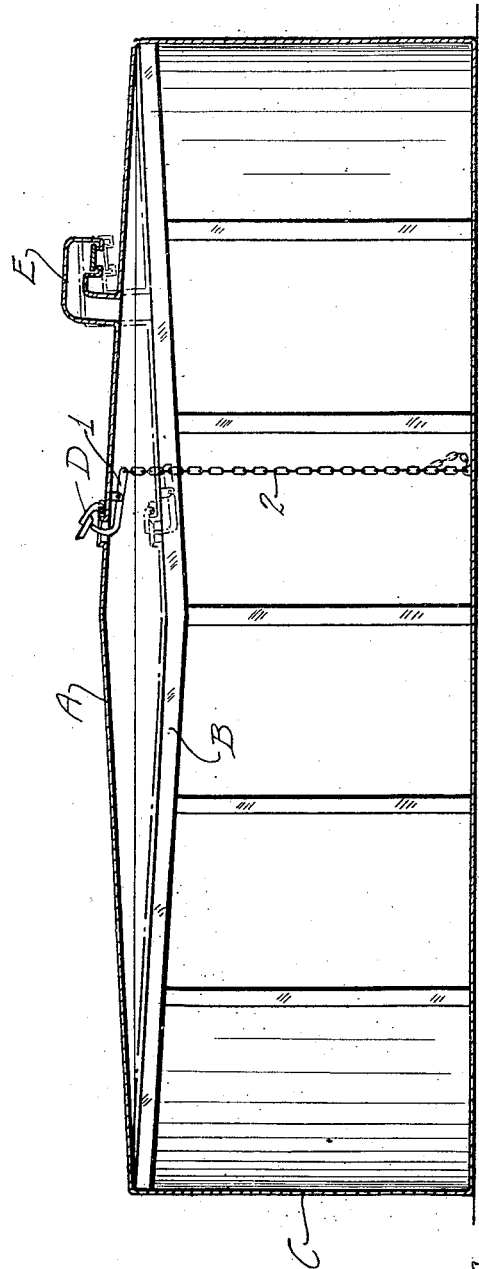
Figure 4:
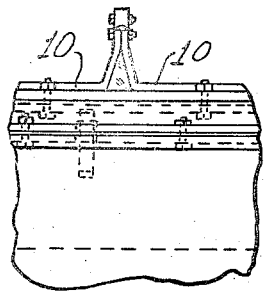
Figure 4 is a detail fragmentary view, looking from the side wall of the tank towards the center of the roof.

In Figure 1 of the drawings I have illustrated a liquid storage tank constructed in accordance with my invention, wherein the roof or top A of the tank is of relatively great diameter, usually 100 ft., more or less, and is made up of sheet metal plates connected together by electric welding or in any other manner that will produce a homogeneous or imperforate diaphragm whose central portion is normally depressed or arranged in the form of an inverted cone and sustained by a stationary supporting structure B located inside of the tank, the peripheral edge of said roof being permanently connected to the side wall C of the tank. When the internal pressure of the tank is less than the weight of the roof A, the central portion of said roof rests upon the supporting structure B, but whenever the internal pressure of the tank becomes greater than the weight of the roof, due to expansion of the gases or vapors therein, the central portion of the roof moves or flexes upwardly into the position shown in full lines in Figure 1, thereby causing the roof to change from an inverted cone to a cone that extends upwardly above a horizontal plane intermediate the two extreme positions of the roof. Under ordinary conditions the upward movement of the central potion of the roof will increase the vapor space of the tank sufficiently to prevent the vapors from being forced out of the tank and to prevent the roof from being subjected to injurious strains as previously described. The supporting structure B that sustains the roof when the upward pressure exerted on the underside of the roof is less than the weight of the roof, is constructed so that it conforms approximately to the shape of the roof when said roof is flexed downwardly. Consequently, said supporting structure effectively prevents the roof from being subjected to a severe tensil strain, in the event the roof is subjected to an abnormal external load, or in the event an abnormal vacuum is exerted on the underside of the roof, when the roof rests upon said supporting structure. To take care of abnormal conditions the tank is provided with a relief valve D that normally remains tightly seated, but which is so constructed that it will be opened or rendered operative by the upward movement of the central portion of the roof when the internal volume of the tank approaches a dangerous degree. In the form of my invention herein illustrated the relief valve D is mounted on the central portion of the roof A of the tank and the control element or valve element of said valve is connected by means of a system of rigid and flexible members 1 and 2, such, for example, as links and chains, with the bottom of the tank or some stationary portion of the tank, so that the valve D will open automatically, and thus vent the vapor space or gas space of the tank when the roof A reaches a certain position during its upward movement. In order that air will be admitted to the interior of the tank during the operation of withdrawing liquid from same, the tank is provided with a vacuum relief valve E of any preferred type or kind constructed so that the controlling element of same will open automatically, and thus admit air to the tank when liquid is being drawn out of the tank. In instances where the diameter is so small that the metal from which the roof is constructed will not safely wrinkle sufficiently to provide for the change in the radii and circumference, produced by upward and downward movement of the central portion of the roof, and in instances where a considerable variation in the volume of the vapor space is desired, the roof or top of the tank is formed from substantially wedge-shaped members that radiate from the center of the roof and which are of substantially V-shape or channel shape in transverse cross section, so that the angularly-disposed portions or side flanges of same will be capable of flexing or bending back and forth when the central portion of the roof moves either upwardly or downwardly from a horizontal plane, as previously described. Figures 2 to 6, inclusive, of the drawing illustrate a tank roof of this construction. Said roof is composed of a number of substantially wedge-shaped members 10 that radiate from a hole or opening 10ª at the center of the roof and which are substantially V-shaped or channel-shaped in cross section, as shown in Figure 6. The side portions or flanges of the members 10 are rigidly connected together at their upper edges in such a way as to form gas-tight joints between said parts and at the peripheral edge of the roof the members 10 are connected to a ring 11, which, in turn, is hinged or pivotally connected to the side wall C of the tank so as to provide for the up and down movement of the roof when it flexes, as previously described. Any suitable means can be used for hinging or pivotally connecting the ring 11 to the side wall of the tank, but I prefer to connect split rings 12 to the underside of said ring, as shown in Figure 3, and provide the side wall of the tank with an inwardly-projecting flange 13 that carries bearings 14 on which the rings 12 rock, the flange 13 having holes 14ª in same through which the rings 12 pass. A gas-tight joint is produced between the side wall of the tank and the ring 11 at the peripheral edge of the roof by means of a flexible member 15 constructed from lead or from gas-tight fabric that is secured to the ring 11 and to the inwardly-projecting flange 13 on the side wall, as shown in Figure 3. At the center of the roof is a flexible closure for the center hole 10ª in the roof, said closure being formed preferably by a tubular member 16 constructed of lead or other suitable material whose upper end is closed by a plate 17 and whose lower end portion is joined to the roof members 10 adjacent the center hole in the roof in such a way as to produce gas-tight joints between said parts, one way of accomplishing this being to shape the lower end portion of the tubular flexible member 16 so that it conforms to the cross-sectional shape of the roof members 10 and clamp it tightly to the webs and side flanges of said roof members by clamping bars 18, as shown in Figure 6.

Normally the roof rests upon and is sustained by a supporting structure B inside of the tank, and when the internal pressure of the tank equals the weight of the roof, said roof moves upwardly, thereby increasing the volume of the vapor space above the surface of the liquid in the tank, the side flanges or side portions of the roof members 10 spreading sufficiently to provide for the increased radii and circumference. Thereafter, when the roof moves downwardly, due to the internal gas or vapor volume of the tank decreasing, the side portions or side flanges of the roof members 10 flex in a direction to reduce the circumference of the central portion of the roof, as it approaches the horizontal plane intermediate the two extreme positions of the roof, and after said horizontal plane has been passed, said side flanges or portions spread or flex in the opposite direction. The roof is provided with a pressure relief valve D and a vacuum relief valve E of the kind previously referred to in the description of the tank shown in Figure 1.

From the foregoing it will be seen that I have produced a tank for storing volatile liquids that has a gas-tight roof forming an integral part of the tank and constructed in such a manner that it is capable of moving in a direction to automatically increase the volume of the vapor space above the liquid in the tank, due, of course, to the fact that the central portion of the roof is capable of moving upwardly away from the surface of the liquid when the internal pressure of the tank equals the weight of the roof. Moreover, in my improved tank there is no liability of the roof being blown off or subjected to injurious strains in the event the internal volume of the tank approaches a dangerous degree, due to the fact that the upward movement of the roof relatively to the side wall, is used to open a pressure relief valve or other suitable venting mechanism. While I have herein described my tank as being used for storing volatile liquids, I wish it to be understood that it is capable of use for storing gases.

Having thus described my invention, what I claim as new and desire to secure by Letters Patent is:

1. A tank for storing gases and volatile liquids provided with a substantially concaved metal roof connected to the side wall of the tank and constructed so as to have sufficient inherent elasticity or flexibility to permit the central portion of same to move upwardly above a horizontal plane, thus increasing the volume of the vapor space of the tank when the upward pressure exerted on the underside of the roof exceeds the weight of the roof, and to resume its concave form when the upward pressure exerted on the underside of the roof becomes less than the weight of the roof.

2. A tank for storing gases and volatile liquids provided with a roof that is connected to the side wall of the tank and which is capable of moving or flexing in a direction to increase or decrease the volume of the vapor space in the tank under certain conditions, and a mechanism for venting said vapor space operated by the movement of said roof relatively to the side wall of the tank.

3. A tank for storing gases and volatile liquids provided with a substantially concave metal roof that is connected to the side wall of the tank and which has sufficient inherent elasticity or flexibility to permit it to reverse and assume a convex form when pressure inside of the tank in excess of the weight of the roof is exerted on the underside of the roof, and a venting mechanism combined with said roof that is rendered operative by the upward movement of the roof relatively to the side wall.

4. A tank for storing gases and volatile liquids provided with a roof that is connected at its peripheral edge to the side wall of the tank and which is constructed so that it will flex in a direction to increase or decrease the volume of the vapor space in the tank, depending upon the upward pressure which is exerted on the underside of said roof, and a supporting structure in the tank for said roof shaped so as to sustain said roof adequately throughout its substantially entire area when the pressure exerted on the underside of the roof is less than the weight of the roof.

5. A tank for storing gases and volatile liquids provided with a roof connected at its peripheral edge to the side wall of the tank and constructed so that it is capable of assuming a concave form or a convex form, depending upon the upward pressure exerted on the underside of the roof, a supporting structure inside of the tank that conforms approximately to the shape of the roof when said roof occupies its concaved form, and a normally inoperative venting mechanism that comes into operation automatically when the roof reaches a certain position during its upward movement relatively to the side wall of the tank.

6. A tank for storing gases and volatile liquids provided with a roof connected at its peripheral edge to the side wall of the tank and formed from metal plates that are combined in such a way as to form a substantially homogeneous or imperforate diaphragm that is capable of assuming the form of a cone or inverted cone, depending upon the force or pressure inside of the tank that is exerted upwardly on the underside of the roof, thereby causing the volume of the vapor space of the tank to vary.

7. A storage tank of the kind defined in claim 6 provided with a venting mechanism for the vapor space that is rendered operative by the upward movement of the roof relatively to the side wall of the tank.

8. A storage tank of the kind defined in claim 6 equipped with a relief valve, a means operated by the upward movement of the roof relatively to the side wall of the tank for causing said valve to open, and means for firmly supporting said roof throughout its substantially entire area when said roof occupies its inverted cone shape.

9. A tank for storing gases and volatile liquids provided with a roof or top hinged or pivotally connected to the side wall of the tank and constructed so that it can flex or stretch sufficiently to provide for the increased circumference of the central portion of the roof, produced by downward or upward movement of said central portion from a horizontal plane.

10. A tank for storing gases and volatile liquids provided with a roof or top constructed of radially-disposed, wedge-shaped members of approximately V-shape or channel shape in cross section whose side portions or flanges are joined together in such a way as to permit said side portions or flanges to spread or contract when the internal pressure of the tank is such as to cause the roof to assume convex or concave form.

11. A tank for storing gases and volatile liquids provided with a roof or top constructed so that it resembles an inverted cone when the internal pressure of the tank is less than the weight of said roof, said roof comprising portions that are capable of flexing in a direction to first reduce the circumference of the central portion of the roof and thereafter increase said circumference when the internal pressure of the tank builds up sufficiently to overcome the weight of the roof and move the roof upwardly.

12. A tank for storing gases and volatile liquids provided with a metal roof or top connected to the side wall of the tank and equipped with a center opening and with portions that are capable of flexing or bending so as to permit said roof to assume a concave form or a convex form depending upon the force or pressure inside of the tank that is exerted upwardly on said roof, and a flexible closure for said center opening.

13. A tank for storing gases and volatile liquids, provided with a metal roof or top constructed so that the central portion of same can flex upwardly or downwardly from a horizontal plane, means for pivotally connecting the peripheral edge of said roof to the side wall of the tank, means for maintaining a gas-tight joint between said roof and side wall, a center opening in said roof, and a flexible closure for said center opening.

14. A tank for storing gases and volatile liquids provided with a roof or top composed of a number of radially-disposed members of such cross-sectional shape that portions of same can flex or bend sufficiently to permit the roof to assume nearly the shape of an inverted cone that is located below a horizontal plane or approximately the shape of a cone that is arranged above said plane, a hinged or pivotal connection between the peripheral edge of the roof and the side wall of the tank, and means for maintaining a gas-tight joint between the tank side wall and the roof.

15. A tank for storing gases and volatile liquids provided with a roof or top composed of a number of radially-disposed members of substantially V-shape or channel shape in cross section having the upper edges of their side portions or flanges connected together and disposed so as to form a roof of nearly inverted cone shape when the internal pressure of the tank is less than the weight of the roof, a center opening in the roof, a flexible closure for said center opening, and means in the tank for sustaining said roof when it is in its inverted form.

16. A tank for storing gases and volatile liquids provided with a roof or top composed of a number of radially-disposed members of substantially V-shape or channel shape in cross section having the upper edges of their side portions or flanges connected together and disposed so as to form a roof of nearly inverted cone shape when the internal pressure of the tank is less than the weight of the roof, a center opening in the roof, a flexible closure for said center opening, means in the tank for sustaining said roof when it is in its inverted form, pivotal connections between said roof members and the side wall of the tank, and means for maintaining a gas-tight joint between the tank side wall and the peripheral edge of the roof.

17. A tank for storing gases and volatile liquids provided with a roof or top composed of a number of radially-disposed members of substantially V-shape or channel shape in cross section having the upper edges of their side portions or flanges connected together and disposed so as to form a roof of nearly inverted cone shape when the internal pressure of the tank is less than the weight of the roof, a center opening in the roof, a flexible closure for said center opening, means in the tank for sustaining said roof when it is in its inverted form, pivotal connections between said roof members and the side wall of the tank, means for maintaining a gas-tight joint between the tank side wall and the peripheral edge of the roof, a pressure relief valve, and means operated by the up and down movement of the central portion of the roof for opening and closing said valve.

18. A tank for storing gases and volatile liquids, comprising a top or roof composed of a number of substantially wedge-shaped members of approximately V-shape or channel shape in cross section having the top edges of their side portions or flanges connected together, a center opening in the roof, a flexible tubular member connected to said roof members adjacent the said center opening and closed at its upper end, a ring at the peripheral edge of the roof to which said roof members are connected, a portion on the side wall of the tank on which said ring rocks, and a flexible means for maintaining a tight joint between the tank side wall and said ring.

19. A tank for storing gases and volatile liquids, comprising a top or roof composed of a number of substantially wedge-shaped members of approximately V-shape or channel shape in cross-section having the top edges of their side portions or flanges connected together, a center opening in the roof, a flexible tubular member connected to said roof members adjacent said center opening and closed at its upper end, a ring at the peripheral edge of the roof to which said roof members are connected, a portion on the side wall of the tank on which said ring rocks, a flexible means for maintaining a tight joint between the tank side wall and said ring, a pressure relief valve mounted on the roof adjacent the center of same, and an operating device for said valve arranged so that the upward movement of the roof effects the opening of said valve.

JOHN H. WIGGINS.